(12) United States Patent
Kang et al.

(10) Patent No.: US 12,375,164 B2
(45) Date of Patent: Jul. 29, 2025

(54) METHOD, DEVICE, TERMINAL AND SERVICE DEVICE FOR DETERMINING SATEELLITE COMMUNICATIONS SYSTEM PARAMETERS

(71) Applicant: DATANG MOBILE COMMUNICATIONS EQUIPMENT CO., LTD., Beijing (CN)

(72) Inventors: Shaoli Kang, Beijing (CN); Shaohui Sun, Beijing (CN); Deshan Miao, Beijing (CN); Jiancheng Sun, Beijing (CN); Jing Liang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 922 days.

(21) Appl. No.: 17/604,547

(22) PCT Filed: Mar. 18, 2020

(86) PCT No.: PCT/CN2020/079833
§ 371 (c)(1),
(2) Date: Oct. 18, 2021

(87) PCT Pub. No.: WO2020/211586
PCT Pub. Date: Oct. 22, 2020

(65) Prior Publication Data
US 2022/0200694 A1    Jun. 23, 2022

(30) Foreign Application Priority Data
Apr. 18, 2019    (CN) .......................... 201910313897.6

(51) Int. Cl.
*H04B 7/185*     (2006.01)
*H04W 88/16*     (2009.01)

(52) U.S. Cl.
CPC ..... *H04B 7/18513* (2013.01); *H04B 7/18519* (2013.01); *H04W 88/16* (2013.01)

(58) Field of Classification Search
CPC .. H04B 7/18513; H04B 7/1851; H04B 7/185; H04B 7/18521; H04B 7/1853; H04W 84/06; H04W 4/024
See application file for complete search history.

(56) References Cited

U.S. PATENT DOCUMENTS

2005/0095982 A1    5/2005    Blanchard et al.

FOREIGN PATENT DOCUMENTS

| CA | 2323992 A1 | * | 5/2001 | ......... H04B 7/18534 |
| CA | 2376977 C | * | 7/2006 | ........... H01Q 1/1257 |

(Continued)

OTHER PUBLICATIONS

Ericsson, CATT, ETRI, "Remaining details on Random access for NTN", Agenda Item 6.6.3.1, 3GPP TSG-RAN WG2 #108, Tdoc R2-1916388, Reno, Nevada, US, Nov. 18-22, 2019.

(Continued)

*Primary Examiner* — Khalid W Shaheed
(74) *Attorney, Agent, or Firm* — Harness, Dickey & Pierce, P.L.C.

(57) ABSTRACT

A method, a device, a terminal and a service device for determining satellite communication system parameters are provided. The method includes: obtaining gateway station information, according to an ephemeris information table or a system message; calculating feeder link information of a current communication link, according to the obtained gateway station information; and determining a satellite communication system parameter of the terminal according to the feeder link information.

17 Claims, 9 Drawing Sheets

(56) References Cited

FOREIGN PATENT DOCUMENTS

| | | | |
|---|---|---|---|
| CA | 2631753 A1 * | 4/2007 | ............ G06F 15/16 |
| CN | 101109805 A | 1/2008 | |
| CN | 106507953 B | 3/2012 | |
| CN | 102749634 A | 10/2012 | |
| CN | 105721038 A | 6/2016 | |
| CN | 105871495 A | 8/2016 | |
| CN | 106093987 A | 11/2016 | |
| CN | 107528628 A | 12/2017 | |
| EP | 3416302 A1 | 12/2018 | |
| WO | WO-2018/052744 A2 | 3/2018 | |
| WO | WO-2018/057168 A1 | 3/2018 | |

OTHER PUBLICATIONS

Extended European Search Report dated May 6, 2022 for Application No. EP 20791951.5.
Chinese Office Action dated Mar. 2, 2021 for Chinese Application No. 201910313897.6.
Liu Yan-Jing, et al., "Feeder Link Handover Schemes of Low Earth Orbit Satellite Mobile", School of Communication and Information Engineering, Univ. of Electron. Sci. & Tech. of Chine, Chengdu 610054, China Academic Journal Electronic Publishing House, vol. 36, No. 2, Apr. 2007.
Chinese Office Action dated Sep. 16, 2021 for Chinese Application No. 201910313897.6.
Written Opinion and International Search Report dated Oct. 28, 2021 for International Application No. PCT/CN2020/079833.
Huawei, Hisilicon, "Discussion on performance assessment for NTN", Agenda Item 7.2.5.1, 3GPP TSG RAN WG1 Meeting #96bis, R1-1903997, Xi'an, China, Apr. 8-12, 2019.

* cited by examiner sending a system message to the terminal, where the system message includes gateway station information — S810
FIG.8
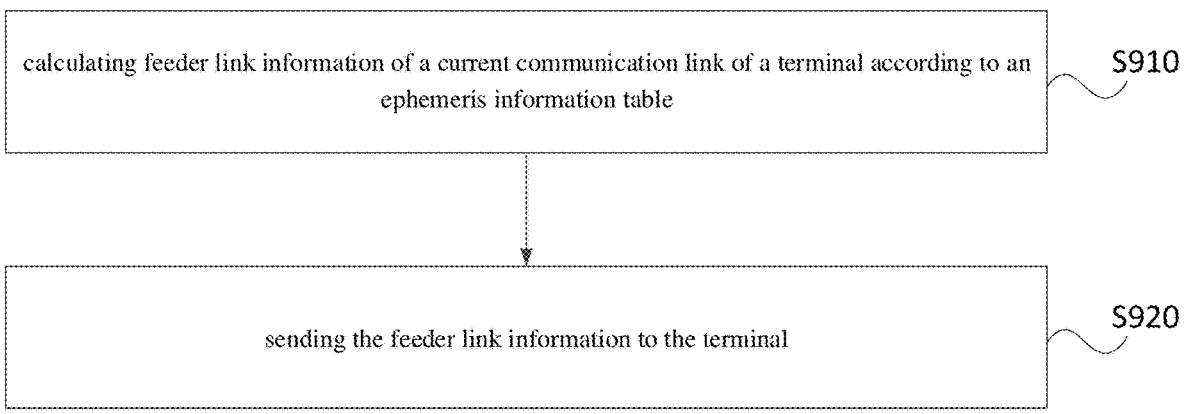
FIG.9
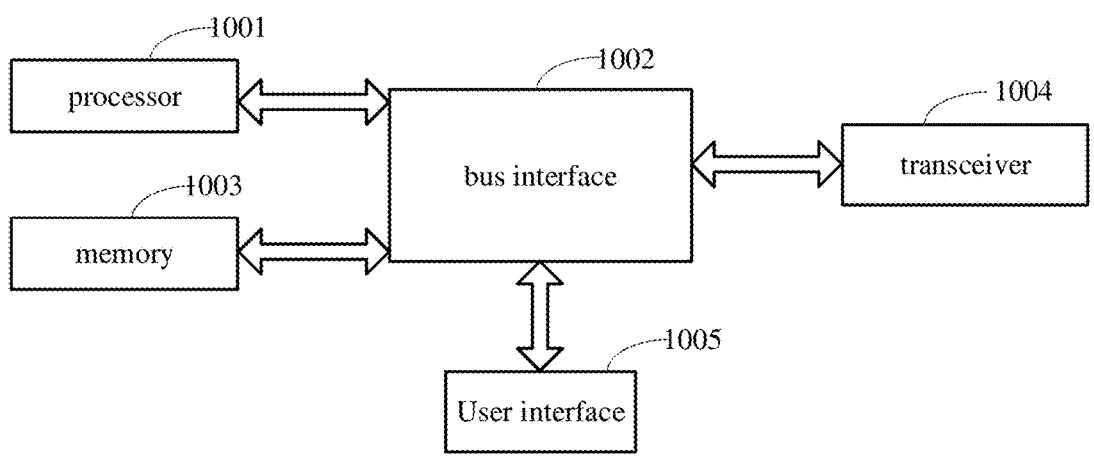
FIG.10

METHOD, DEVICE, TERMINAL AND SERVICE DEVICE FOR DETERMINING SATEELLITE COMMUNICATIONS SYSTEM PARAMETERS

CROSS-REFERENCE TO RELATED APPLICATIONS

This present application is the U.S. national phase of PCT Application No. PCT/CN2020/079833 filed on Mar. 18, 2020, which claims a priority of Chinese patent application No. 201910313897.6 filed on Apr. 18, 2019, each of which is incorporated herein by reference in its entirety.

TECHNICAL FIELD

The present disclosure relates to the technical field of satellite communication, in particular to a method, a device, a terminal and a service device for determining satellite communication system parameters.

BACKGROUND

In a satellite communication system, usually the terminal can determine the link information between the terminal and the satellite, that is, determine the user link (service link). However, a complete communication link includes not only user links, but also feeder links. The feeder link refers to the link between the gateway and the satellite.

Without knowing the feeder link information, the terminal only designs the communication system based on its own user link information, but the complete communication link includes the user link and the feeder link, which are related to the transmission delay Parameter calculation and communication process design will depend on the complete communication link, and during the communication process, with the movement of the satellite, not only the user link will change, but the feeder link will also change, especially between gateways. The change of the feeder link during handover is more obvious, which leads to a relatively low accuracy of system parameter design based only on user link information.

SUMMARY

The purpose of the present disclosure is to provide a method, a device, terminal and a service device for determining satellite communication system parameters, which are used to solve the problem that the terminal can only determine the user link in the satellite communication system which leads to the low accuracy of the system parameter design.

A method for determining satellite communication system parameters is provided in an embodiment of the present disclosure, applied to a terminal and including:
  obtaining gateway station information, according to an ephemeris information table or a system message;
  calculating feeder link information of a current communication link, according to the obtained gateway station information; and
  determining a satellite communication system parameter of the terminal according to the feeder link information.

A method for determining satellite communication system parameters is provided in an embodiment of the present disclosure, applied to a terminal and including:
  obtaining feeder link information of a current communication link of the terminal sent by a gateway station, where the feeder link information is calculated by the gateway station according to the ephemeris information table and then sent by the gateway station;
  determining a satellite communication system parameter of the terminal according to the feeder link information.

A method for determining satellite communication system parameters is provided in an embodiment of the present disclosure, applied to a service device and including:
  sending a system message to a terminal, where the system message includes gateway station information.

A method for determining satellite communication system parameters is provided in an embodiment of the present disclosure, applied to a service device and including:
  calculating feeder link information of a current communication link of a terminal according to an ephemeris information table;
  sending the feeder link information to the terminal.

A terminal is provided in an embodiment of the present disclosure, including: a transceiver, a memory, a processor, and a program stored on the memory and executable on the processor; the processor is configured to perform:
  obtaining gateway station information, according to an ephemeris information table or a system message;
  calculating feeder link information of a current communication link, according to the obtained gateway station information; and
  determining a satellite communication system parameter of the terminal according to the feeder link information.

A terminal is provided in an embodiment of the present disclosure, including: a transceiver, a memory, a processor, and a program stored on the memory and executable on the processor; the processor is configured to perform:
  obtaining feeder link information of a current communication link of the terminal sent by a gateway station, where the feeder link information is calculated by the gateway station according to the ephemeris information table and then sent by the gateway station;
  determining a satellite communication system parameter of the terminal according to the feeder link information.

A service device is provided in an embodiment of the present disclosure, including: a transceiver, a memory, a processor, and a program stored on the memory and executable on the processor; the processor is configured to perform:
  sending a system message to a terminal, where the system message includes gateway station information.

A service device is provided in an embodiment of the present disclosure, including: a transceiver, a memory, a processor, and a program stored on the memory and executable on the processor; the processor is configured to perform:
  calculating feeder link information of a current communication link of a terminal according to an ephemeris information table;
  sending the feeder link information to the terminal.

A device for determining satellite communication system parameters is provided in an embodiment of the present disclosure, applied to a terminal and including:
  a first information obtaining module, configured to obtain gateway station information, according to an ephemeris information table or a system message;
  a first information calculation module, configured to calculate feeder link information of a current communication link, according to the obtained gateway station information; and a first parameter determination module, configured to determine t a satellite communication system parameter of the terminal according to the feeder link information.

A device for determining satellite communication system parameters is provided in an embodiment of the present disclosure, applied to a terminal and including:
a second information obtaining module, configured to obtain feeder link information of a current communication link of the terminal sent by a gateway station, where the feeder link information is calculated by the gateway station according to the ephemeris information table and then sent by the gateway station;
a second parameter determination module, configured to determine a satellite communication system parameter of the terminal according to the feeder link information.

A device for determining satellite communication system parameters is provided in an embodiment of the present disclosure, applied to a service device and including:
a first message sending module, configured to send a system message to a terminal, where the system message includes gateway station information.

A device for determining satellite communication system parameters is provided in an embodiment of the present disclosure, applied to a service device and including:
a second calculation module, configured to calculate feeder link information of a current communication link of a terminal according to an ephemeris information table;
a second message sending module, configured to send the feeder link information to the terminal.

A computer-readable storage medium with a computer program stored thereon is provided in an embodiment of the present disclosure, where the computer program is executed by a processor to perform the method for determining satellite communication system parameters hereinabove.

At least one of the above-mentioned embodiments of the present disclosure has the following beneficial effects:

According to method for determining satellite communication system parameters described in the embodiments of the present disclosure, through the gateway station information recorded in the ephemeris information table or the gateway station information in the system message, the terminal can obtain the gateway station information in the feeder link, and further determine the feeder link information, and perform a more accurate system parameter design based on the feeder link information, so as to avoid the problem that the system parameter design accuracy is low due to that the terminal can only determine the user link.

BRIEF DESCRIPTION OF THE DRAWINGS

FIG. 8 is a schematic flowchart of a method for determining satellite communication system parameters according to another embodiment of the present disclosure;

FIG. 9 is a schematic flowchart of a method for determining satellite communication system parameters according to another embodiment of the present disclosure;

FIG. 10 is a schematic structural diagram of a terminal according to an embodiment of the present disclosure;

DETAILED DESCRIPTION

In order to make the technical problems, technical solutions, and advantages to be solved by the present disclosure clearer, a detailed description will be given below in conjunction with the accompanying drawings and specific embodiments.

Figure 1:
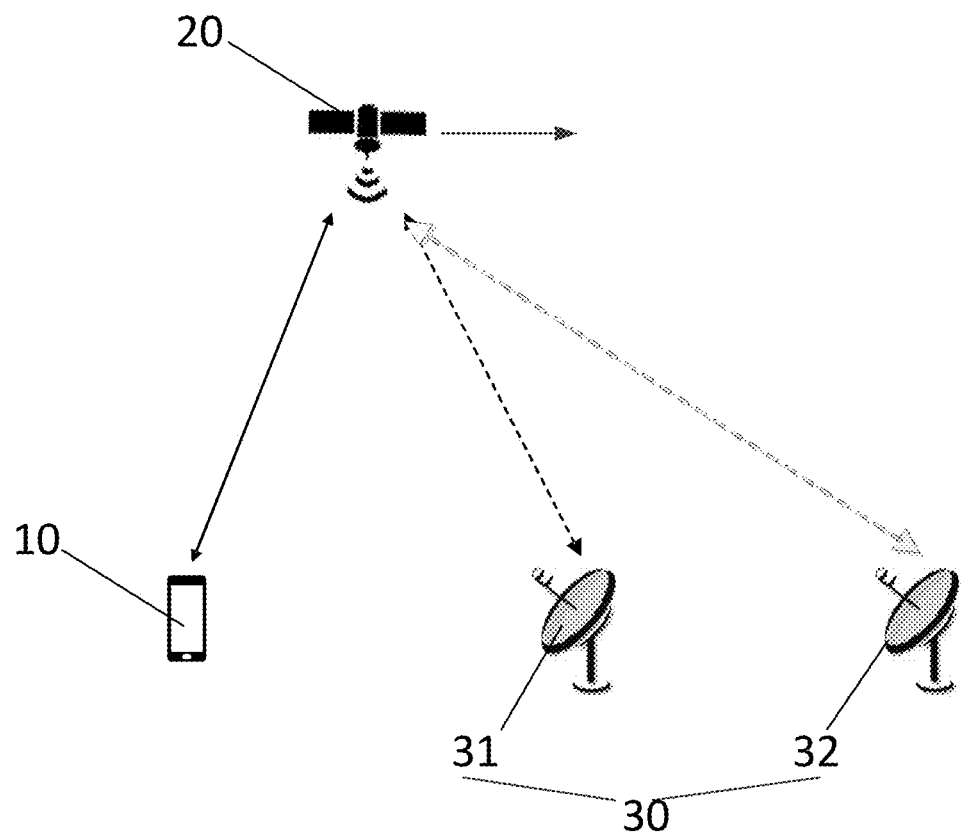
FIG. 1 is a schematic diagram of an architecture of a system applied by the method for determining satellite communication system parameters according to an embodiment of the disclosure.

FIG. 1 is a schematic diagram of the architecture of a system applied by the method for configuring an ephemeris information table according to an embodiment of the disclosure. The system includes a terminal 10, the terminal 10 can communicate with the gateway 30 through a satellite 20, where the link between the terminal 10 and the satellite 20 is a user link, and the link between the gateway 30 and the satellite 20 is a feeder link.

Among them, during the communication process, as the satellite 20 moves, not only the user link will change, but the feeder link will also change. When a gateway station 31 switches to a second gateway station 32, the feeder link of the terminal for satellite communication is switched from feeder link 1 to feeder link 2.

In order to solve the problem that the terminal can only determine the user link information in the related technology in the satellite communication system, which leads to the low accuracy of the system parameter design, the embodiment of the present disclosure provides a method for determining satellite communication system parameters, by adding the gateway station information into the ephemeris information, or send the gateway station information through the system message, the terminal can obtain the information of the gateway station in the feeder link, so as to further determine the feeder link information.

Figure 2:
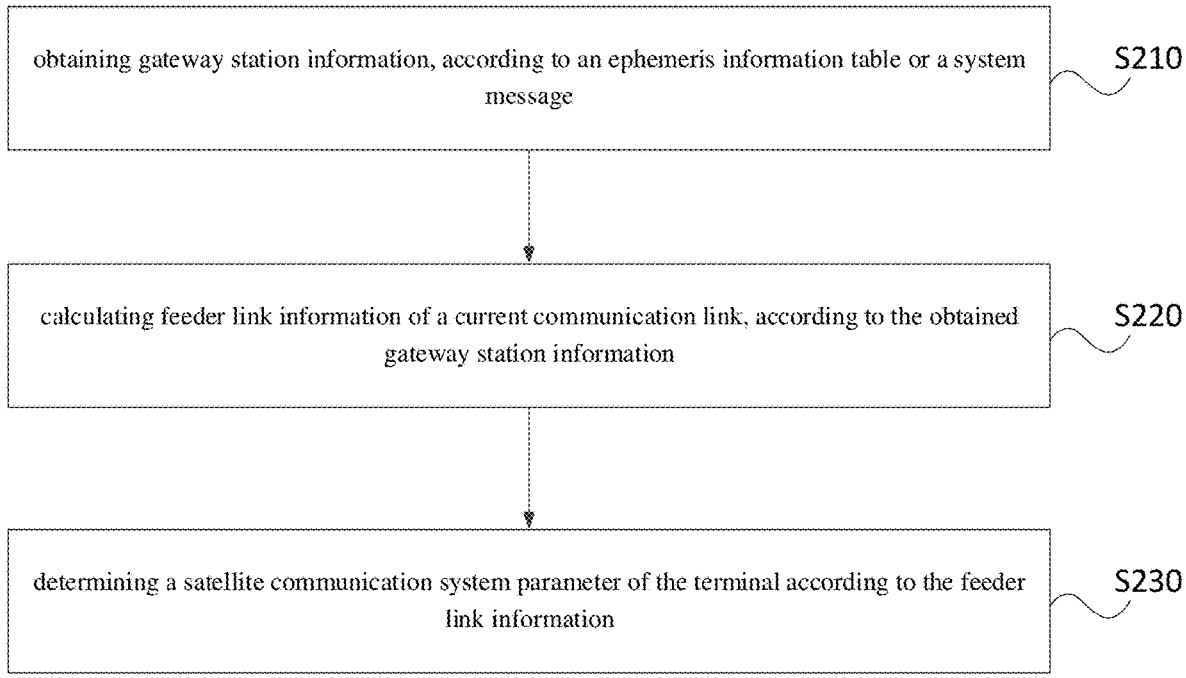
FIG. 2 is a schematic flowchart of a method for determining a parameter of a satellite communication system according to an embodiment of the present disclosure.

A method for determining satellite communication system parameters applied to a terminal is provided in an embodiment of the present disclosure. As shown in FIG. 2, the method includes:

S210: obtaining gateway station information, according to an ephemeris information table or a system message;

S220: calculating feeder link information of a current communication link, according to the obtained gateway station information; and S230: determining a satellite communication system parameter of the terminal according to the feeder link information.

According to method for determining satellite communication system parameters described in the embodiments of the present disclosure, through the gateway station information recorded in the ephemeris information table or the gateway station information in the system message, the terminal can obtain the gateway station information in the feeder link, and further determine the feeder link information, and perform a more accurate system parameter design based on the feeder link information, so as to avoid the problem that the system parameter design accuracy is low due to that the terminal can only determine the user link.

It should be noted that, in the embodiment of the present disclosure, the terminal is any terminal that can communicate with the gateway through a satellite. In addition, the network accessed by the terminal is a satellite mobile communication network.

Optionally, in a case that the gateway station information is obtained according to the ephemeris information table, the gateway station information of each gateway station in a network is obtained;

in a case that the gateway station information is obtained according to the system message, the gateway station information of each gateway station in the network or the gateway station information of the gateway station currently connected to the terminal is obtained.

Specifically, the ephemeris information table can record the gateway station information of each gateway station in the network, and the system message can send the gateway station information of each gateway station in the network, or it can send the information of the gateway station currently connected to the terminal.

Optionally, before step S220, the method further includes:
determining a current serving satellite of the terminal according to satellite information in the ephemeris information table;
where the calculating the feeder link information of the current communication link according to the obtained gateway station information includes:
determining a current serving gateway station of the terminal according to the obtained gateway station information;
calculating the feeder link information of the current communication link according to the current serving satellite and the current serving gateway station.

Figure 3:
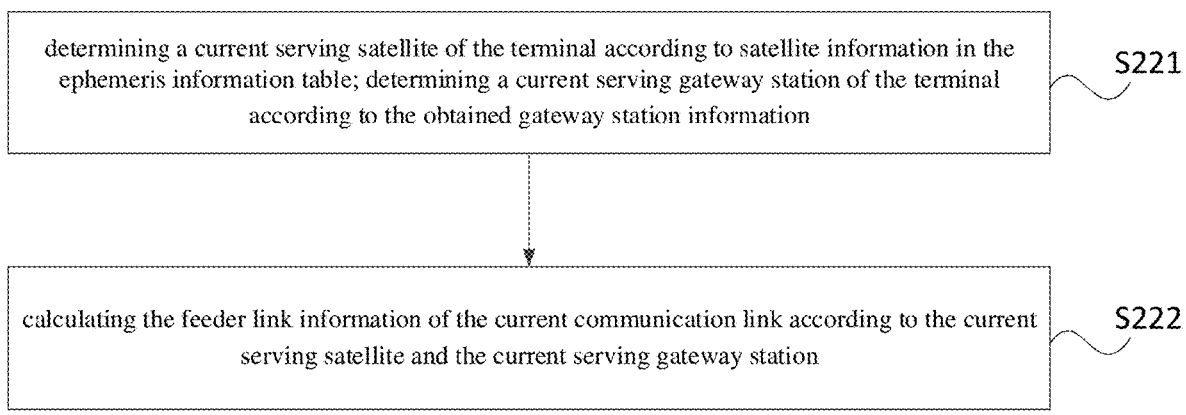
FIG. 3 is a partial schematic flowchart of a method for determining satellite communication system parameters according to an embodiment of the present disclosure.

Therefore, in the embodiment of the present disclosure, after the gateway station information is obtained, the calculation process of the feeder link information can be as shown in FIG. 3, including:

S221: determining a current serving satellite of the terminal according to satellite information in the ephemeris information table; determining a current serving gateway station of the terminal according to the obtained gateway station information;

S222: calculating the feeder link information of the current communication link according to the current serving satellite and the current serving gateway station.

In an embodiment of the present disclosure, in a case that the gateway station information of each gateway station in the network is obtained according to the ephemeris information table or the system message, or in a case that the gateway station information of at least two gateway stations currently connected to the terminal is obtained according to the system message, in step S221, the determining the current serving gateway station of the terminal according to the obtained gateway station information includes:

calculating a distance from the current serving satellite to each gateway station of which the gateway station information is obtained, according to the current serving satellite and the obtained gateway station information;

selecting the gateway station nearest to the current serving satellite as the current serving gateway station.

In another implementation manner of the embodiment of the present disclosure, in a case that the gateway station information of the gateway station currently connected to the terminal is obtained according to the system message, in step S221, the determining the current serving gateway station of the terminal according to the obtained gateway station information includes:

determining the gateway station currently connected to the terminal as the current serving gateway station.

Specifically, in one of the embodiments of the present disclosure, when in step S210, the gateway station information of each gateway station in the network is obtained according to the ephemeris information table, in step S221, according to the obtained gateway station information, the determining the current serving gateway station of the terminal includes:

calculating a distance from the current serving satellite to each gateway station according to the current serving satellite and the obtained gateway station information;

selecting the gateway station with the smallest distance to the current serving satellite as the current serving gateway station;

the gateway station information includes the geographic location information of the gateway station, and the geographic location information of each gateway station in the network can be obtained according to the ephemeris information table.

In this embodiment, in the preset communication process, the terminal obtains the current serving satellite according to its own geographic location and the satellite information in the ephemeris information table; further, it calculates the current serving satellite according to the gateway station information in the ephemeris information table. For the distance between the serving satellite and each gateway, the gateway station with the smallest distance to the current serving satellite is selected as the current serving gateway station.

Through above method, the terminal calculates the distance between the current serving satellite and each gateway, and selects the gateway station with the smallest distance to the current serving satellite as the current serving gateway station.

In addition, in step S220, in the step of calculating the feeder link information of the current communication link based on the obtained gateway station information, the calculated feeder link information includes a distance between the current serving satellite and the current serving gateway station and/or a signal transmission time between the current serving satellite and the current serving gateway station.

In one of the embodiments of the present disclosure, when in step S210, the gateway station information of each gateway station in the network is obtained according to the ephemeris information table, the method further includes:

Before the terminal accesses the network, obtaining the ephemeris information table;

After the terminal accesses the network, when the ephemeris information table is updated, obtaining the updated ephemeris information table; and/or After the terminal accesses the network, the ephemeris information table is obtained every first preset period.

Specifically, before the terminal accesses the network, the ephemeris information table can be obtained through system loading; after the terminal accesses the network, when the ephemeris information table is updated, the updated ephemeris information table can be obtained through the service device connected to the terminal in wireless communication. After the terminal is connected to the network, the ephemeris information table can be obtained from the service device wirelessly connected to the terminal every first preset period.

Based on the above method of obtaining the ephemeris information table, when the satellite information and the gateway station information in the ephemeris information table change, it can be ensured that the terminal can obtain the updated ephemeris information table in real time to further obtain the updated gateway station. The information of the customs clearance station, and the complete communication link information where oneself is located in time.

In one embodiment of the present disclosure, when it is monitored that at least one of the following conditions is met, step S220 is executed to calculate the feeder link information of the current communication link according to the obtained gateway station information:

In an embodiment of the present disclosure, the step S220, i.e., the calculating feeder link information of a current communication link, according to the obtained gateway station information is performed when at least one of the following conditions is met:

the terminal identifies the current serving satellite;
the terminal performs a preset communication process;
a time for calculating the feeder link information every second preset period is reached.

It should be noted that the above-mentioned first preset period and second preset period may be determined by the terminal itself according to system requirements, or may be configured by the server device.

In an implementation manner of the embodiment of the present disclosure, optionally, when it is detected that the terminal recognizes the current serving satellite, step S220 is executed. It is understandable that in the satellite communication process of the terminal, it is necessary to obtain the current serving satellite. In this embodiment, based on obtaining the current serving satellites in the satellite communication process, the terminal's information is calculated based on the satellite information and gateway station information recorded in the ephemeris information table, or based on the gateway station information in the system message. The feeder link information can be calculated and determined in real time during the satellite communication process to increase the accuracy of the feeder link information determination in the satellite communication process.

In another embodiment of the present disclosure, when in step S210, the gateway station information of each gateway station in the network is obtained according to the system message, in step S221, the determining the current serving gateway station of the terminal according to the obtained gateway station information includes:

calculating a distance from the current serving satellite to each gateway station, according to the current serving satellite and the obtained gateway station information;
selecting the gateway station nearest to the current serving satellite as the current serving gateway station.
the gateway station information includes the geographic location information of the gateway station. In this way, the geographic location information of each gateway station in the network can be obtained according to the system message.

In this embodiment, in the preset communication process, the terminal obtains the current serving satellite according to its own geographic location and the satellite information in the ephemeris information table; further, it calculates the current serving satellite according to the gateway station information in the ephemeris information table. For the distance between the serving satellite and each gateway, the gateway station with the smallest distance to the current serving satellite is selected as the current serving gateway station.

Through the above method, the terminal calculates the distance between the current serving satellite and each gateway, and selects the gateway station with the smallest distance to the current serving satellite as the current serving gateway station.

Optionally, the preset communication process includes initial access when the terminal is turned on and random access initiated by link recovery, uplink synchronization, and data request.

Further, optionally, the system message includes:
Master Information Block (MIB) messages, System Information Block (SIB) messages, or Remaining Minimum System Information (RMSI).

In the embodiment of the present disclosure, when obtaining the gateway station information of each gateway station in the network according to the system message, the method further includes:

when the gateway station in the network changes, the updated gateway station information in the system message is obtained.

Through the above process, when the gateway station in the network changes, such as adding a new gateway station or exiting an existing gateway station, the gateway station information in the system message needs to be updated accordingly.

In addition, as the way to obtain the gateway station information of each gateway station in the network through the ephemeris information table, if the gateway station information of each gateway station in the network is obtained through system messages, when at least one of the following conditions is detected to be met, step S220 is executed to calculate the feeder link information of the current communication link according to the obtained gateway station information:

the terminal identifies the current serving satellite;
the terminal performs a preset communication process;
a time for calculating the feeder link information every second preset period is reached.

In yet another embodiment of the present disclosure, when in step S210, the gateway station information of the gateway station currently connected to the terminal is obtained according to the system message, in step S221, the determining the current serving gateway station of the terminal according to the obtained gateway station information includes:

when the gateway station information of the gateway station currently connected to the terminal is obtained according to the system message, and the number of gateway stations currently connected to the terminal is one, the determining the current serving gateway station of the terminal according to the obtained gateway station information includes:

determining the gateway station currently connected to the terminal as the current serving gateway station.

When the gateway station information of the gateway station currently connected to the terminal is obtained according to the system message, and the determining the current serving gateway station of the terminal according to the obtained gateway station information includes:

according to the current serving satellite and the obtained gateway station information, calculating the distance from the current serving satellite to each gateway station of which the gateway station information is obtained;

selecting gateway station with the smallest distance to the current serving satellite as the current serving gateway station;

the gateway station information includes the geographic location information of the gateway station, and in this way, the geographic location information of the gateway station currently connected to the terminal can be obtained according to the system message.

Optionally, the system message is:

Master Information Block (MIB) messages, System Information Block (SIB) messages, or Remaining Minimum System Information (RMSI).

Using the above method, in the preset communication process, the terminal obtains the current serving satellite according to its own geographic location and the satellite information in the ephemeris information table; the terminal obtains the currently connected gateway station according to the system message.

The preset communication process includes initial access when the terminal is turned on, random access initiated by link recovery, uplink synchronization, data request, etc.

In addition, if there is only one gateway station currently connected, it is determined that the current serving gateway station is the currently connected gateway station. If there are at least two gateways currently connected, the gateway station nearest to the current serving satellite is determined as the current serving gateway station.

In addition, it is the same way that the gateway station information of each gateway station in the network is obtained through the ephemeris information table. When the gateway station information of the gateway connected to the terminal is obtained through the system message, when at least one of the following conditions is detected to be met, step S220 is executed to calculate the feeder link information of the current communication link according to the obtained gateway station information:

the terminal identifies the current serving satellite;
the terminal performs a preset communication process;
a time for calculating the feeder link information every second preset period is reached.

On the basis of obtaining the feeder link information by adopting any of the above embodiments, the method described in the embodiment of the present disclosure is adopted, and further, in step S230, the determining the satellite system communication parameters of the terminal according to the feeder link information parameters includes:

determining the satellite communication system parameters of the terminal when the terminal performs random access or uplink service transmission;
the satellite communication system parameters include the transmission delay of the communication link and/or the time advance of the terminal to send data.

Specifically, when the terminal executes a preset communication process, the current serving satellite is identified, and the satellite communication system parameters of the terminal are determined.

Specifically, the preset communication process includes, but is not limited to, only includes: initial access when the terminal is turned on, random access initiated by link recovery, uplink synchronization, and data request. The satellite communication system parameters are calculated parameters corresponding to each preset communication process.

Take the random access in the communication process as an example. The random access process requires multiple round-trip signal transmissions between the terminal and the gateway to complete, so the total length of random access is equal to multiple round-trip signal transmission communication link transmissions. Time delay, the complete communication link includes the user link from the terminal to the satellite and the feeder link from the satellite to the gateway station. Therefore, for the random access process, the satellite communication system parameters that needs to be calculated according to the feeder link information include the transmission delay of the communication link. In addition, in order to ensure the time alignment of the signal transmission and reception in the frame structure, the time advance (TA) sent by the terminal needs to be calculated based on the transmission delay of the complete communication link. Therefore, for the random access process, according to the satellite communication system parameters that need to be calculated for the feeder link information may also include the timing advance.

Based on the above description, those skilled in the art should be able to understand the satellite communication system parameters that can be calculated separately according to the feeder link information when the terminal executes each preset communication process, and examples are not given here.

It should be noted that, in the embodiment of the present disclosure, the feeder link information includes the distance and/or signal transmission time between the current serving satellite and the current serving gateway station.

Using the method for determining satellite communication system parameters in the embodiment of the present disclosure, the gateway station information recorded in the ephemeris information table, or the gateway station information of each gateway station in the system message or the gateway station currently connected to the terminal. The gateway station information of the station enables the terminal to determine the current serving satellite based on its own position information and the satellite information in the ephemeris information table, and calculate the current serving gateway station based on the geographic location of the current serving satellite and the gateway station, so as to further calculate the transmission length and/or transmission time of the required feeder link based on the current serving satellite and the current serving gateway station.

The following takes the communication process of the 5G-based Low Earth Orbit (LEO) satellite mobile communication system as an example to further illustrate the method described in the embodiment of the present disclosure.

Embodiment One

In this embodiment, taking the process of powering on the terminal to access the network as an example, the determination of the satellite communication system parameters in the process of accessing the network by recording the gateway station information in the ephemeris information table is taken as an example for illustration.

Among them, the terminal will go through a series of communication processes such as initial cell search, random access, radio resource control (Radio Resource Control, RRC) connection, security establishment, terminal capability interaction, RRC radio resource configuration, data transmission, etc. The total time experienced by these communication processes can be as high as hundreds of milliseconds or even several seconds. Since the residence time of the terminal in a certain beam of a certain satellite is also very short, usually in the order of seconds, it is necessary for the terminal to access the network as short as possible and control it to complete within one beam.

The time for the terminal to access the network depends not only on the time of a single link transmission, but also on the optimization of the communication process, and obtaining more information in advance is often an effective means for optimizing the communication process.

Figure 4:
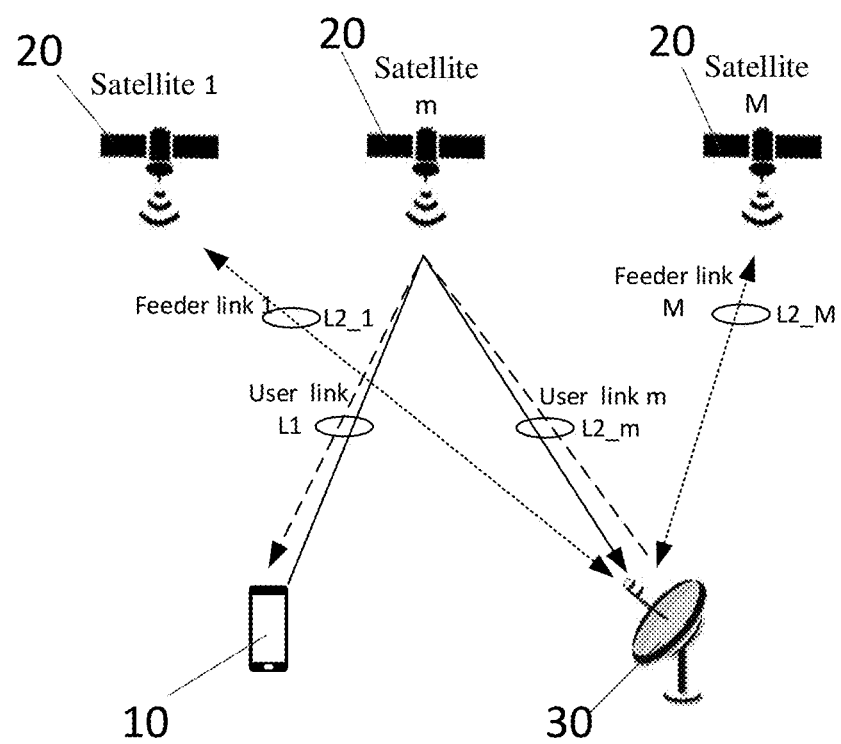
FIG. 4 is a schematic diagram of a first connection state using of method described in an embodiment of the present disclosure.

Specifically, when the terminal is powered on to perform the initial cell search, it can clarify its current serving satellite according to its own geographic location information and ephemeris information table. As shown in FIG. 4, the current serving satellite of the terminal 10 can be set as the mth satellite. In the same way, because the gateway station 30 also has its own geographic location information and can obtain the ephemeris information table in advance, the gateway station 30 can know all the satellites it is currently connected to in real time, as shown in FIG. 4, set the gateway Station 30 is currently connected to M satellites.

It can be seen that for a one-way communication link from the terminal 10 through the satellite 20 to the gateway 30, if only satellite information is recorded in the ephemeris information table, the terminal can calculate the user link information, and the gateway can The feeder link information is calculated, but the terminal does not know the feeder link information, and the gateway station does not know the user link information. However, if the terminal can learn the feeder link information before accessing, it can predict the time it takes to complete the access, so as to design a reasonable access process to ensure that the access is completed within one beam.

Therefore, using the method for determining satellite communication system parameters described in the embodiments of the present disclosure, in the ephemeris information table of the 5G-based LEO low-orbit satellite communication system, in addition to satellite information, the geographic location information of all gateway stations is also added, where the geographic location information can be marked by latitude and longitude, as shown in Table 1 below.

TABLE 1

| gateway station number | gateway station longitude | gateway station latitude |
|---|---|---|
| #1 | 116 degrees east longitude | 40 degrees north latitude |
| #2 | 0 degrees west longitude | 51 degrees north latitude |
| ... | ... | ... |
| #N | 37 degrees east longitude | 55 degrees north latitude |

Using the ephemeris information table that adds the information of the gateway station, when the terminal is turned on for the initial cell search, it first obtains the geographic location of all gateway stations according to the ephemeris information table, and then calculates the current serving satellite and each gateway station Distance, and judge the gateway station corresponding to the current serving satellite based on the shortest distance.

As shown in FIG. 4, for a certain terminal 10 communicating with the mth satellite, set the distance of its user link to L1 and the distance of the feeder link to L2_m, then the unidirectional communication link of the terminal 10 Transmission time $T=L1/c+L2\_m/c$, where c represents the speed of light.

According to the transmission time of the one-way communication link, the terminal can predict the time required to complete the random access. For example, it will require at least $T\_rach=2T$ under 2-step random access, and at least $T\_rach=4T$ under 4-step random access. Where T_rach is the time required for the random access process. According to the random access time, the terminal will determine whether to continue random access and subsequent communication processes in the beam.

As described in the embodiment of the present disclosure, by adding the gateway station information to the ephemeris information table, the terminal can understand the feeder link information of the satellite communication system in real time, so as to be able to enable the feeder link information to be designed for more accurate system parameters.

Embodiment Two

In this embodiment, take the random access process of the terminal in the cell as an example, obtain the gateway station information of each gateway station in the network through system messages, and determine the satellite communication system parameters in the process of accessing the network as an example.

Figure 5:
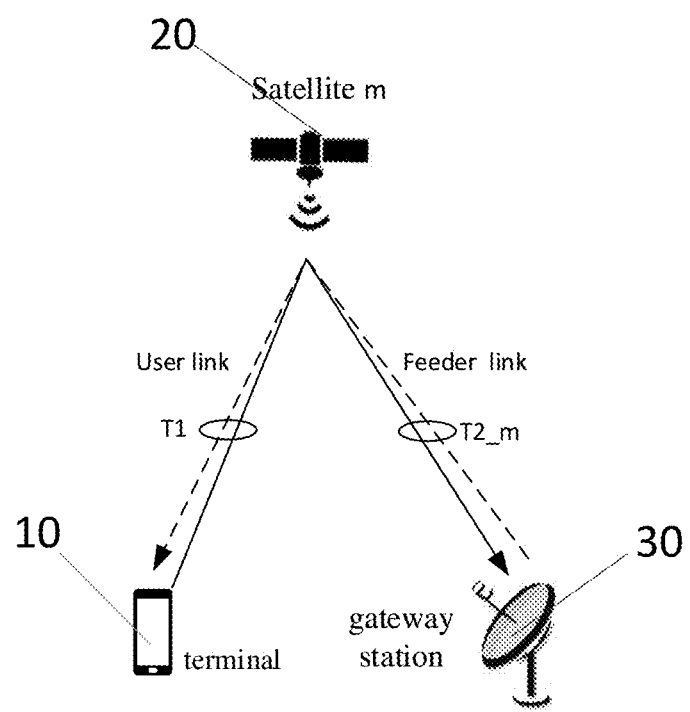
FIG. 5 is a schematic diagram of a second connection state of the method described in an embodiment of the present disclosure.

When a terminal initiates random access in a cell covered by a certain beam of a certain satellite, it needs to estimate the time for the completion of the random access process, and this time depends on the steps of the random access process and the time of the communication link. Without loss of generality, assuming the simplest 2-step random access process, the terminal communicates with the mth satellite, including the process of sending random access signals from the terminal to the gateway, and the gateway returning random access to the terminal The process of responding to messages, so the minimum random access completion time that the terminal can estimate is the time of a single uplink communication link plus a single downlink communication link, that is, the time of two unidirectional communication links, $T\_m=2(T1+T2\_m)$, where T_m represents the total time of 2-step random access, T1 represents the transmission time from the terminal 10 to the satellite 20, and T2_m represents the transmission time from the satellite 20 to the gateway 30, as shown in FIG. 5. Assuming that the gateway 30 is currently connected to M satellites 20, and the terminal 10 communicates with the m-th satellite 20, as shown in FIG. 4, the calculation of T2_m adopts the method described in the embodiment of the present disclosure. Specifically, the following method can be used:

In the system information table of the satellite communication system, the position information of all the gateways of the system is added. It is assumed that the position information of the gateways marked with latitude and longitude is shown in Table 1, and the system information resource SIBx is configured to transmission. The terminal can obtain its own position information through positioning. In addition, the terminal can obtain the current serving satellite and its corresponding position information according to the ephemeris information table. Based on these location information, the terminal can calculate the distance of the current user link (assuming it is marked as L1). According to the system information table, the terminal can obtain the position information of each gateway station, and can calculate the distance between the current serving satellite (assumed as the mth satellite) and the feeder link of each gateway station (assumed to be marked as L2_mn, n=1 . . . N, N is the number of all gateways), and the gateway corresponding to the minimum distance is regarded as the gateway connected to the current serving satellite, assuming that the transmission distance from the current serving satellite to the gateway is marked as L2_m=min(L2_mn)). Based on the link distances L1 and L2_m, the terminal can obtain the transmission time of the current user link and the current feeder link: T1=L1/c, T2_m=L2_m/c, and c represents the speed of light. Therefore, the terminal can know the shortest time T_m=2(T1+T2_m) required to complete the random access by itself, and arrange the corresponding communication process design according to this time.

Embodiment Three

In this embodiment, taking the random access process of the terminal in the cell as an example, the system message, configured to obtain the gateway station information of the gateway station currently connected in the network, and the satellite communication system parameters in the process of accessing the network are determined.

Figure 6:
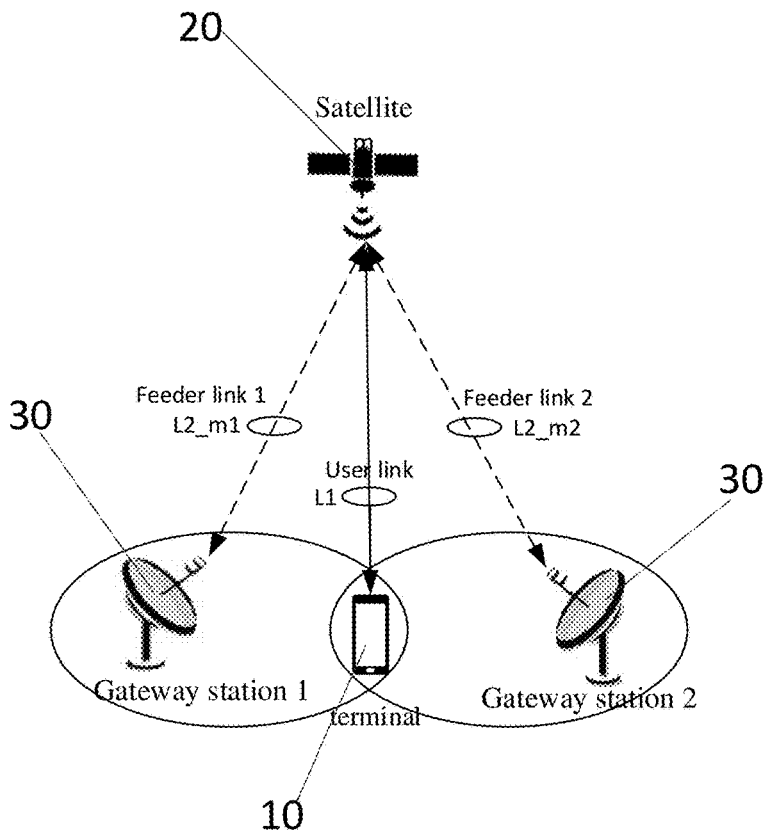
FIG. 6 is a schematic diagram of a third connection state of the method described in an embodiment of the present disclosure.

Similar to the second embodiment, when a terminal initiates random access in a cell covered by a certain beam of a certain satellite, it is assumed that the simplest 2-step random access process is adopted. The terminal communicates with the mth satellite, including the process by which the terminal sends the random access signal to the gateway station and the process by which the gateway station returns a random access response message to the terminal. Therefore, the minimum random access completion time that the terminal can estimate is a single uplink communication link plus a single downlink communication link T_m=2(T1+T2_m), where T_m represents the total time of 2-step random access, T1 represents the transmission time from terminal 10 to satellite 20, and T2_m represents The transmission time from the satellite 20 to the gateway 30 is shown in FIG. 5. Assuming that the gateway 30 is currently connected to M satellites 20, and the terminal 10 communicates with the $m^{th}$ satellite 20, as shown in FIG. 4, the calculation of T2_m adopts the method described in the embodiment of the present disclosure. Specifically, the following can be used Method: Add the position information of all the gateway stations currently connected to the system information table of the satellite communication system, as shown in FIG. 6, using the system information resource SIBx for transmission. The terminal 10 can obtain its own position information through positioning. In addition, the terminal 10 can obtain the current serving satellite and its corresponding position information according to the ephemeris information table. Based on these location information, the terminal 10 can calculate the distance of the current user link (assuming it is marked as L1). According to the system information table, the terminal can obtain the position information of each gateway station 30 currently connected, and can calculate the distance between the current serving satellite and the feeder link of each gateway station currently connected (assuming the label is L2_mq, Q=1 . . . Q, Q is the number of all gateway stations connected to the mth satellite 20). If Q=1, that is, the mth satellite 20 is connected to only one gateway, then the current serving gateway is the currently connected gateway, L2_m=L2_m1; if Q>1, the mth satellite 20 has more connections If there are two gateways, the current serving gateway is the one with the smallest feeder link distance, that is, L2_m=min (L2_mq)). In this way, based on the link distances L1 and L2_m, the terminal 10 can obtain the current transmission time of the user link and the feeder link: T1=L1/c, T2_m=L2_m/c, and c represents the speed of light. Therefore, the terminal 10 can learn the shortest time T_m=2(T1+T2_m) required to complete the random access by itself, and arrange the corresponding communication process design according to this time.

Figure 7:
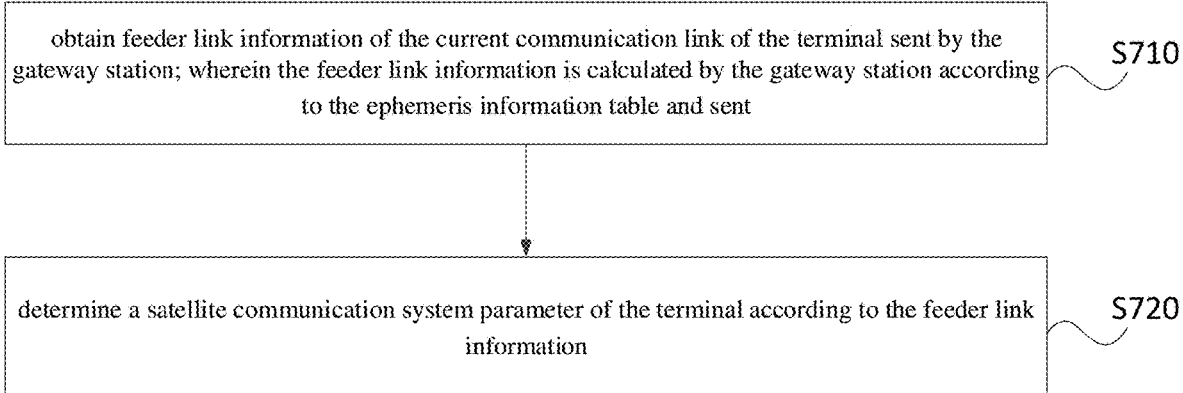
FIG. 7 is a schematic flowchart of a method for determining satellite communication system parameters according to another embodiment of the present disclosure.

Another embodiment of the present disclosure also provides a method for determining satellite communication system parameters, which is applied to a terminal. As shown in FIG. 7, the method includes:

S710: obtain feeder link information of the current communication link of the terminal sent by the gateway station; wherein the feeder link information is calculated by the gateway station according to the ephemeris information table and sent;

S720: determine a satellite communication system parameter of the terminal according to the feeder link information.

The method for determining satellite communication system parameters described in the embodiment of the present disclosure calculates the feeder link information of the current communication link of the terminal through the gateway, and sends the feeder link information to the terminal, so that the terminal understands the current communication link in real time, the feeder link information can be used to design more accurate system parameters based on the feeder link information, so as to avoid the problem that the terminal can only determine the user link, resulting in low system parameter design accuracy.

It should be noted that, in the embodiment of the present disclosure, the terminal is any terminal that can communicate with the gateway through a satellite. In addition, the network accessed by the terminal is a satellite mobile communication network.

Optionally, in the embodiment of the present disclosure, the determining the satellite communication system parameters of the terminal according to the feeder link information includes:

determining the satellite communication system parameters of the terminal when the terminal performs random access or uplink service transmission;

the satellite communication system parameters include the transmission delay of the communication link and/or the time advance of the terminal to send data.

Optionally, in step S710, the obtaining the feeder link information of the current communication link of the terminal sent by the gateway includes:

obtaining the feeder link information sent by the gateway station through the system message in the common channel; or obtaining the feeder link information sent by the gateway station through the user message in the service channel.

In the above manner, the gateway station distributes the feeder link information to all terminals in the current jurisdiction. The feeder link information can be used as a system message and sent on a common channel, for example, by using a broadcast channel. Alternatively, the feeder link information can also be sent as a user-specific message in the service channel.

In addition, optionally, in step S710, obtaining the feeder link information of the current communication link of the terminal sent by the gateway station includes:

every third preset period, the feeder link information of the current communication link of the terminal sent by the gateway station is obtained.

Specifically, the period for obtaining feeder link information (the third preset period) can be configured, which can be determined by the terminal itself according to system requirements, or configured by the server device.

In the embodiment of the present disclosure, optionally, the feeder link information includes the distance and/or signal transmission time between the current serving satellite and the current serving gateway station in the current communication link.

The following takes a 2-step random access process in a 5G-based Low Earth Orbit (LEO) satellite mobile communication system as an example to further illustrate the method described in the embodiment of the present disclosure.

When a terminal initiates random access in a cell covered by a certain beam of a certain satellite, it needs to estimate the time for the completion of the random access process, and this time depends on the steps of the random access process and the time of the communication link. Without loss of generality, assuming the simplest 2-step random access process, the terminal communicates with the mth satellite, including the process of sending random access signals from the terminal to the gateway, and the gateway returning random access to the terminal the process of responding to messages, so the minimum random access completion time that the terminal can estimate is the time of a single uplink communication link plus a single downlink communication link, that is, the time of two unidirectional communication links, $T\_m=2(T1+T2\_m)$, where $T\_m$ represents the total time of 2-step random access, T1 represents the transmission time from the terminal to the satellite, and $T2\_m$ represents the transmission time from the satellite to the gateway, as shown in FIG. 5. Assuming that the gateway station is currently connected to M satellites, and the terminal communicates with the mth satellite among them, as shown in FIG. 4, the calculation of $T2\_m$ can specifically adopt the following methods.

With the implementation of the method described in the embodiments of the present disclosure, the gateway station can obtain the position information of each satellite currently connected to it according to the ephemeris information table. In addition, the gateway station can obtain its own position information through positioning. Based on these location information, the gateway can calculate the distance of the feeder link of each satellite currently connected to it (assuming the mark is $L2\_m, m=1 \ldots M$), and can calculate the feeder link distance based on the distance. Transmission time $T2\_m=L2\_m/c$, c represents the speed of light.

Further, the gateway station encodes the transmission time of each feeder link into a basic message reflecting the feeder link information, and then sends it as a system message using a common channel, or as a user-specific message using a dedicated channel. Specifically, the gateway station sends $T2\_m$ information to all cells corresponding to the mth satellite currently connected. Without loss of generality, assuming that the current serving satellite of the terminal is the mth satellite, the terminal can obtain the transmission time $T2\_m$ of the current feeder link from the public channel or the dedicated channel. In addition, the terminal can also rely on the ephemeris information and its own position information. Calculate the distance L1 of the current user link and the transmission time $T1=L1/c$. Therefore, the terminal can know the shortest time $T\_m=2(T1+T2\_m)$ required to complete the random access, and use the calculated time to Arrange the corresponding communication process design.

Therefore, using the method for determining satellite communication system parameters in the embodiment of the present disclosure, the gateway station calculates the feeder link information of the terminal's current communication link, and sends the feeder link information to the terminal, so that the terminal can understand the current feeder link information of the communication link, so as to design more accurate system parameters based on the feeder link information, so as to avoid the problem that the terminal can only determine the user link resulting in low system parameter design accuracy.

The embodiment of the present disclosure also provides a method for determining satellite communication system parameters, which is applied to a service device, as shown in FIG. 8, including:

S810: sending a system message to the terminal, where the system message includes gateway station information.

In the method described in the embodiment of the present disclosure, the service device sends the gateway station information to the terminal through the system message, so that the terminal can calculate the feeder link information of the current communication link according to the obtained gateway station information, and then calculate the feeder link information of the current communication link according to the feeder link information, determine the satellite communication system parameters of the terminal, so that the terminal can obtain the gateway station information in the feeder link, and further determine the feeder link information, and perform a more accurate system parameter design based on the feeder link information, so as to avoid the problem that the system parameter design accuracy is low due to that the terminal can only determine the user link.

Optionally, the system message includes the gateway station information of each gateway station in the network or includes the information of the gateway to which the terminal is currently connected.

Optionally, the system message includes:
a main information block MIB message, a system information block SIB message, or a remaining minimum system message RMSI.

Optionally, the gateway station information includes geographic location information of the gateway station.

Optionally, when the system message includes the gateway station information of each gateway station in the network, the method further includes: when the gateway in the network changes, for example, a new gateway is added or a new gateway is added. If a gateway station exits, the gateway station information in the system message needs to be updated accordingly.

The embodiment of the present disclosure also provides a method for determining satellite communication system parameters, which is applied to a service device, as shown in FIG. 9, including:

S910: calculating feeder link information of a current communication link of a terminal according to an ephemeris information table;

S920: sending the feeder link information to the terminal.

In the embodiment of the present disclosure, the service device calculates the feeder link information of the current communication link of the terminal, and sends the feeder link information to the terminal, so that the terminal can perform more accurate system parameter design based on the feeder link information, and avoid the problem that the terminal can only determine the user link, which causes the low accuracy of the system parameter design.

Optionally, in step S920, the sending the feeder link information to the terminal includes:

sending the feeder link information through a system message in a common channel; or sending the feeder link information through a user messages in a service channel.

In the above manner, the gateway station distributes the feeder link information to all terminals in the current jurisdiction. The feeder link information can be used as a system message and sent on a common channel, for example, by using a broadcast channel. Alternatively, the feeder link information can also be sent as a user-specific message in the service channel.

Optionally, in step S910, the calculating the feeder link information of the current communication link of the terminal according to the ephemeris information table includes:

calculating the feeder link information of the current communication link of the terminal every fourth preset period;

the sending the feeder link information to the terminal includes:

sending the feeder link information to the terminal every fifth preset period.

Based on the above process, the time period for the service device to calculate the feeder link information (fourth preset period) and the time period for sending the feeder link information to the terminal (fifth preset period) can be configured. Using the method for determining satellite communication system parameters described in the embodiments of the present disclosure, the gateway station can obtain the position information of each satellite currently connected to it according to the ephemeris information table. In addition, the gateway station can obtain its own position information through positioning. Based on these location information, the gateway can calculate the distance of the feeder link of each satellite currently connected to it, and calculate the transmission time of the feeder link based on the distance. Further, the gateway station can send the calculated distance and/or transmission time of the feeder link as a system message to the terminal using a common channel, or as a user-specific message to the terminal using a dedicated channel.

The embodiment of the present disclosure further provides a terminal. As shown in FIG. 10, the terminal includes: a processor 1001; and a memory 1003 connected to the processor 1001 through a bus interface 1002, and the memory 1003 is configured to storing For the programs and data used by the processor 1001 when performing operations, the transceiver 1004 is connected to the bus interface 1002 for receiving and sending data under the control of the processor 1001.

When the processor 1001 calls and executes the programs and data stored in the memory 1003, the following process is executed:

obtaining gateway station information, according to an ephemeris information table or a system message;

calculating feeder link information of a current communication link, according to the obtained gateway station information; and determining a satellite communication system parameter of the terminal according to the feeder link information.

Optionally, the processor is configured to perform:

in a case that the gateway station information is obtained according to the system message, obtaining the gateway station information of each gateway station in a network;

Optionally, the processor is further configured to perform:

determining a current serving satellite of the terminal according to satellite information in the ephemeris information table;

where the calculating the feeder link information of the current communication link according to the obtained gateway station information includes:

determining a current serving gateway station of the terminal according to the obtained gateway station information;

calculating the feeder link information of the current communication link according to the current serving satellite and the current serving gateway station.

Optionally, in a case that the gateway station information of each gateway station in the network is obtained according to the ephemeris information table or the system message, or in a case that the gateway station information of at least two gateway stations currently connected to the terminal is obtained according to the system message, the determining the current serving gateway station of the terminal according to the obtained gateway station information includes:

calculating a distance from the current serving satellite to each gateway station of which the gateway station information is obtained, according to the current serving satellite and the obtained gateway station information;

selecting the gateway station nearest to the current serving satellite as the current serving gateway station.

Optionally, in a case that the gateway station information of the gateway station currently connected to the terminal is obtained according to the system message, the determining the current serving gateway station of the terminal according to the obtained gateway station information includes:

determining the gateway station currently connected to the terminal as the current serving gateway station.

Optionally, the system message is:

a main information block MIB message, a system information block SIB message, or a remaining minimum system message RMSI.

Optionally, the gateway station information includes geographic location information of the gateway station.

Optionally, the feeder link information includes a distance between the current serving satellite and the current serving gateway station and/or a signal transmission time between the current serving satellite and the current serving gateway station.

Optionally, when obtaining the gateway station information of each gateway station in the network according to the ephemeris information table, the processor is further configured to perform:
  before the terminal accesses the network, obtaining the ephemeris information table; and/or
  after the terminal accesses the network and when the ephemeris information table is updated, obtaining the updated ephemeris information table; and/or
  after the terminal accesses the network, obtaining the ephemeris information table every first preset period.

Optionally, when obtaining the gateway station information of each gateway station in the network according to the system message, the processor is further configured to perform:
  when the gateway station in the network changes, obtaining the updated gateway station information in the system message.

Optionally, the calculating feeder link information of a current communication link, according to the obtained gateway station information is performed when at least one of the following conditions is met:
  the terminal identifies the current serving satellite;
  the terminal performs a preset communication process;
  a time for calculating the feeder link information every second preset period is reached.

It should be noted that, in FIG. 10, the bus architecture may include any number of interconnected buses and bridges, and specifically one or more processors represented by the processor 1001 and various circuits of the memory represented by the memory 1003 are linked together. The bus architecture can also link various other circuits such as peripheral devices, voltage regulators, power management circuits, etc., which are all known in the art, and therefore, no further description will be given herein. The bus interface provides the interface. The transceiver 1004 may be a plurality of elements, that is, including a transmitter and a transceiver, and provide a unit for communicating with various other devices on a transmission medium. For different terminals, the user interface 1005 may also be an interface capable of connecting externally and internally with required device. The connected device includes but not limited to a keypad, a display, a speaker, a microphone, a joystick, and the like. The processor 1001 is responsible for managing the bus architecture and general processing, and the memory 1003 can store data used by the processor 1001 when performing operations.

Those skilled in the art can understand that all or part of the steps in the foregoing embodiments can be implemented by hardware, or by a computer program that instructs related hardware. The computer program includes instructions for performing part or all of the steps of the foregoing method. And the computer program can be stored in a readable storage medium, which can be any form of storage medium.

Figure 11:
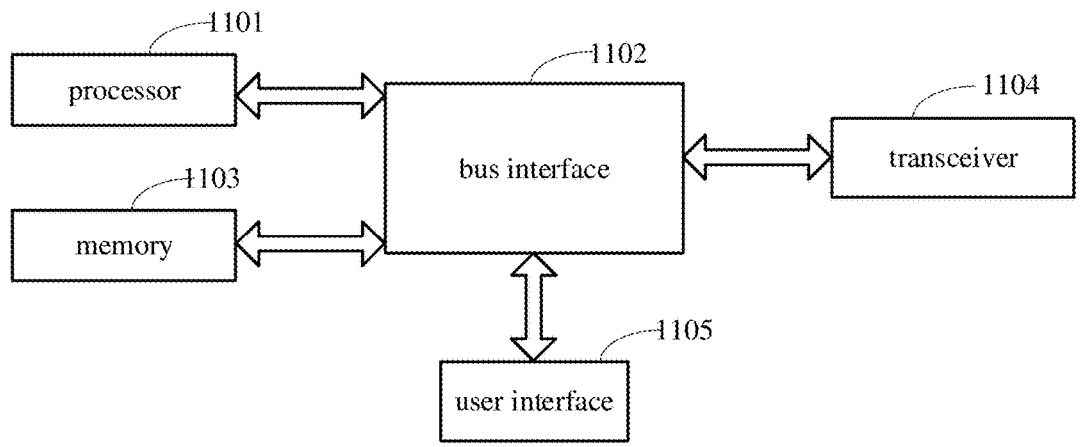
FIG. 11 is a schematic structural diagram of a terminal according to another embodiment of the present disclosure.

The present disclosure also provides a terminal according to another embodiment. As shown in FIG. 11, the terminal includes: a processor 1101; and a memory 1103 connected to the processor 1101 through a bus interface 1102, and the memory 1103 is configured to storing For the programs and data used by the processor 1101 when performing operations, the transceiver 1104 is connected to the bus interface 1102 for receiving and sending data under the control of the processor 1101.

When the processor 1101 calls and executes the programs and data stored in the memory 1103, the following process is executed:

obtaining feeder link information of a current communication link of the terminal sent by a gateway station, where the feeder link information is calculated by the gateway station according to the ephemeris information table and then sent by the gateway station;
  determining a satellite communication system parameter of the terminal according to the feeder link information.

Optionally, the determining a satellite communication system parameter of the terminal according to the feeder link information comprises:
  determining the satellite communication system parameter of the terminal when the terminal performs the random access or uplink service sending;
  where the satellite communication system parameter includes communication link transmission delay and/or a time advance for terminal to send data.

Optionally, the obtaining the feeder link information of the current communication link of the terminal sent by the gateway station includes:
  obtaining the feeder link information sent by the gateway station through a system message in a common channel; or
  obtaining the feeder link information sent by the gateway station through a user message in a service channel.

Optionally, the obtaining the feeder link information of the current communication link of the terminal sent by the gateway station includes:
  obtaining the feeder link information of the current communication link of the terminal sent by the gateway station, every third preset period.

Optionally, the feeder link information includes a distance between a current serving satellite and a current serving gateway station and/or a signal transmission time between a current serving satellite and a current serving gateway station.

It should be noted that in FIG. 11, the bus architecture may include any number of interconnected buses and bridges. Specifically, one or more processors represented by the processor 1101 and various circuits of the memory represented by the memory 1103 are linked together. The bus architecture can also link various other circuits such as peripheral devices, voltage regulators, power management circuits, etc., which are all known in the art, and therefore, no further description will be given herein. The bus interface provides the interface. The transceiver 1104 may be a plurality of elements, including a transmitter and a transceiver, and provide a unit for communicating with various other devices on the transmission medium. For different terminals, the user interface 1105 may also be an interface capable of connecting externally and internally with required device. The connected device includes but not limited to a keypad, a display, a speaker, a microphone, a joystick, and the like. The processor 1101 is responsible for managing the bus architecture and general processing, and the memory 1103 can store data used by the processor 1101 when performing operations.

Figure 12:
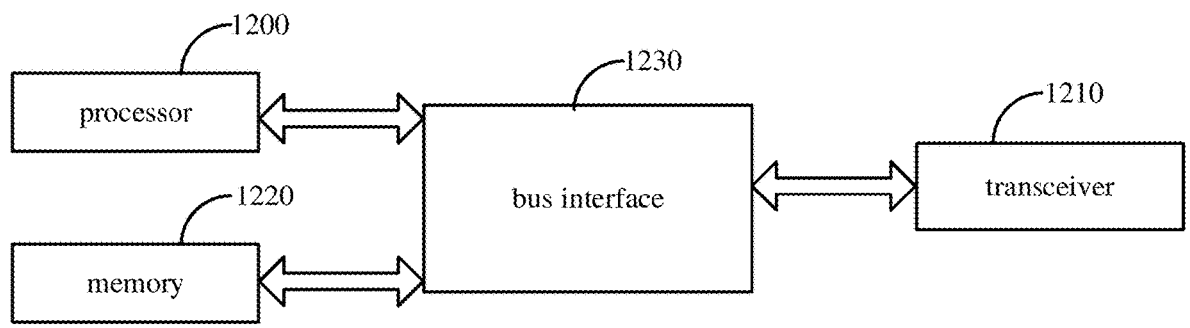
FIG. 12 is a schematic structural diagram of a network device according to one of the embodiments of the present disclosure.

The embodiment of the present disclosure also provides a service device. As shown in FIG. 12, the server device includes:
  a processor 1200; a memory 1220 connected to the processor 1200 through a bus interface 1230, and a transceiver 1210 connected to the processor 1200 through a bus interface; the memory 1220, configured to store the processor used when performing operations The program and data of the; send data information or pilot through the transceiver 1210, and also receive the uplink control channel through the transceiver 1210;

when the processor 1200 calls and executes the programs and data stored in the memory 1220, The following functional modules are implemented: the processor 1200, configured to read the program in the memory 1220 and execute the following process:

sending a system message to a terminal, where the system message includes gateway station information.

Optionally, the system message includes the gateway station information of each gateway station in the network or includes the information of the gateway to which the terminal is currently connected.

Optionally, the system message is:

a main information block MIB message, a system information block SIB message, or a remaining minimum system message RMSI.

Optionally, the gateway station information includes geographic location information of the gateway station.

In addition, in FIG. 12, the bus architecture may include any number of interconnected buses and bridges. Specifically, one or more processors represented by the processor 1200 and various circuits of the memory represented by the memory 1220 are linked together. The bus architecture can also link various other circuits such as peripheral devices, voltage regulators, power management circuits, etc., which are all known in the art, and therefore, no further description will be given herein. The bus interface provides the interface. The transceiver 1210 may be a plurality of elements, including a transmitter and a transceiver, and provide a unit for communicating with various other devices on a transmission medium. The processor 1200 is responsible for managing the bus architecture and general processing, and the memory 1220 can store data used by the processor 1200 when performing operations.

Figure 13:
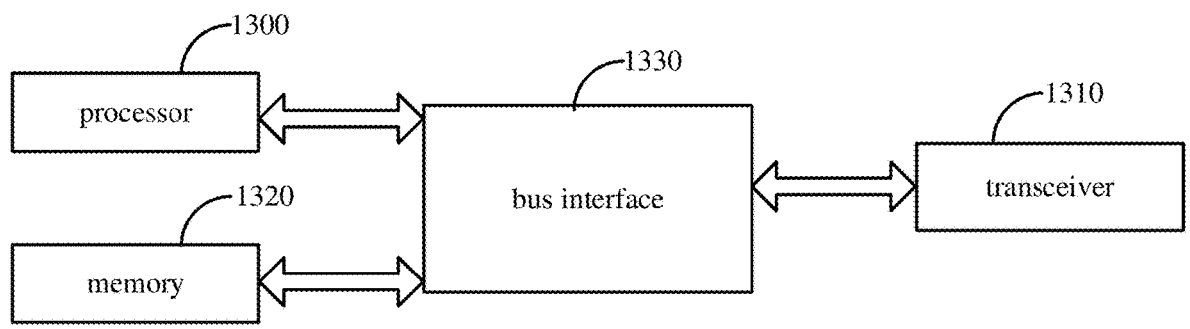
FIG. 13 is a schematic structural diagram of a network device according to another embodiment of the present disclosure.

The embodiment of the present disclosure also provides a service device. As shown in FIG. 13, the server device includes:

a processor 1300; a memory 1320 connected to the processor 1300 through a bus interface 1330, and a transceiver 1310 connected to the processor 1300 through a bus interface; the memory 1320, configured to store the processor used when performing operations The program and data; send data information or pilot through the transceiver 1310, and also receive the uplink control channel through the transceiver 1310; when the processor 1300 calls and executes the programs and data stored in the memory 1320, The following functional modules are implemented: the processor 1300, configured to read the program in the memory 1320 and execute the following process:

calculating feeder link information of a current communication link of a terminal according to an ephemeris information table;

sending the feeder link information to the terminal.

Optionally, the sending the feeder link information to the terminal includes:

sending the feeder link information through a system message in a common channel; or sending the feeder link information through a user messages in a service channel.

Optionally, the calculating the feeder link information of the current communication link of the terminal according to the ephemeris information table includes:

calculating the feeder link information of the current communication link of the terminal every fourth preset period;

the sending the feeder link information to the terminal includes:

sending the feeder link information to the terminal every fifth preset period.

In addition, in FIG. 13, the bus architecture may include any number of interconnected buses and bridges. Specifically, one or more processors represented by the processor 1300 and various circuits of the memory represented by the memory 1320 are linked together. The bus architecture can also link various other circuits such as peripheral devices, voltage regulators, power management circuits, etc., which are all known in the art, and therefore, no further description will be given herein. The bus interface provides the interface. The transceiver 1310 may be a plurality of elements, that is, including a transmitter and a transceiver, and provide a unit for communicating with various other devices on the transmission medium. The processor 1300 is responsible for managing the bus architecture and general processing, and the memory 1320 can store data used by the processor 1300 when performing operations.

Figure 14:
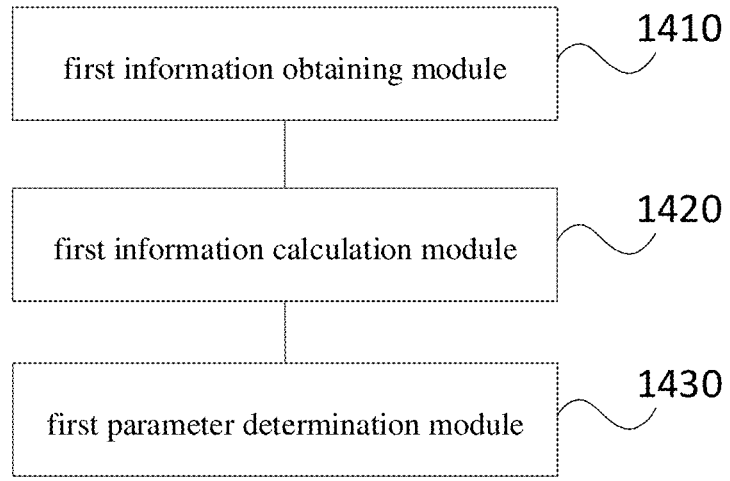
FIG. 14 is a schematic structural diagram of an apparatus for determining a parameter of a satellite communication system according to an embodiment of the disclosure.

The embodiment of the present disclosure also provides a device for determining satellite communication system parameters, which is applied to a terminal. As shown in FIG. 14, the device includes:

a first information obtaining module 1410, configured to obtain gateway station information, according to an ephemeris information table or a system message;

a first information calculation module 1420, configured to calculate feeder link information of a current communication link, according to the obtained gateway station information; and a first parameter determination module 1430, configured to determine a satellite communication system parameter of the terminal according to the feeder link information.

Optionally, the first information obtaining module 1410 is configured to perform:

in a case that the gateway station information is obtained according to the system message, obtaining the gateway station information of each gateway station in the network or the gateway station information of the gateway station currently connected to the terminal.

Optionally, the first information calculation module 1420 is further configured to perform: determining a current serving satellite of the terminal according to satellite information in the ephemeris information table;

where the calculating the feeder link information of the current communication link according to the obtained gateway station information includes:

determining a current serving gateway station of the terminal according to the obtained gateway station information;

calculating the feeder link information of the current communication link according to the current serving satellite and the current serving gateway station.

Optionally, in a case that the gateway station information of each gateway station in the network is obtained according to the ephemeris information table or the system message, or in a case that the gateway station information of at least two gateway stations currently connected to the terminal is obtained according to the system message, the determining the current serving gateway station of the terminal according to the obtained gateway station information includes:

calculating a distance from the current serving satellite to each gateway station of which the gateway station information is obtained, according to the current serving satellite and the obtained gateway station information;

selecting the gateway station nearest to the current serving satellite as the current serving gateway station.

Optionally, in a case that the gateway station information of the gateway station currently connected to the terminal is obtained according to the system message, the determining the current serving gateway station of the terminal according to the obtained gateway station information includes:
determining the gateway station currently connected to the terminal as the current serving gateway station.
Optionally, the system message is:
a main information block MIB message, a system information block SIB message, or a remaining minimum system message RMSI.

Optionally, the gateway station information includes geographic location information of the gateway station.

Optionally, the feeder link information includes a distance between the current serving satellite and the current serving gateway station and/or a signal transmission time between the current serving satellite and the current serving gateway station.

Optionally, when obtaining the gateway station information of each gateway station in the network according to the ephemeris information table, the first information obtaining module 1410 is further configured to perform:
before the terminal accesses the network, obtaining the ephemeris information table;
after the terminal accesses the network and when the ephemeris information table is updated, obtaining the updated ephemeris information table; and/or
after the terminal accesses the network, obtaining the ephemeris information table every first preset period.

Optionally, when obtaining the gateway station information of each gateway station in the network according to the system message, the first information obtaining module 1410 is further configured to perform:
when the gateway station in the network changes, obtaining the updated gateway station information in the system message.

Optionally, the calculating feeder link information of a current communication link, according to the obtained gateway station information is performed when at least one of the following conditions is met:
the terminal identifies the current serving satellite;
the terminal performs a preset communication process;
a time for calculating the feeder link information every second preset period is reached.

Figure 15:
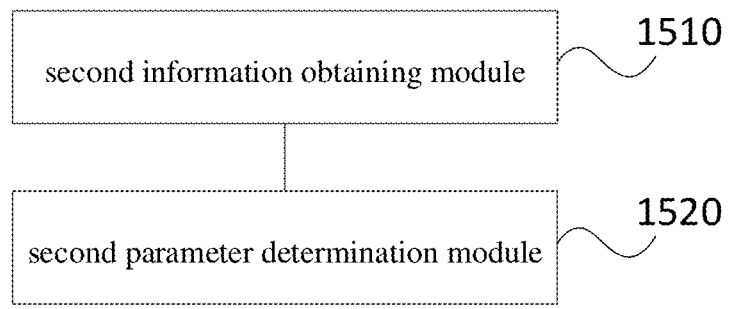
FIG. 15 is a schematic structural diagram of an apparatus for determining satellite communication system parameters according to another embodiment of the present disclosure.

A device for determining satellite communication system parameters applied to a terminal is further provided in an embodiment of the present disclosure. A shown in FIG. 15, the device includes:
a second information obtaining module 1510, configured to obtain feeder link information of a current communication link of the terminal sent by a gateway station, where the feeder link information is calculated by the gateway station according to the ephemeris information table and then sent by the gateway station;
a second parameter determination module 1520, configured to determine a satellite communication system parameter of the terminal according to the feeder link information.

Optionally, the determining a satellite communication system parameter of the terminal according to the feeder link information includes:
determining the satellite communication system parameter of the terminal when the terminal performs the random access or uplink service sending;
where the satellite communication system parameter includes communication link transmission delay and/or a time advance for terminal to send data.

Optionally, the obtaining the feeder link information of the current communication link of the terminal sent by the gateway station includes:
obtaining the feeder link information sent by the gateway station through a system message in a common channel; or
obtaining the feeder link information sent by the gateway station through a user message in a service channel.

Optionally, the obtaining the feeder link information of the current communication link of the terminal sent by the gateway station includes:
obtaining the feeder link information of the current communication link of the terminal sent by the gateway station, every third preset period.

Optionally, the feeder link information includes a distance between a current serving satellite and a current serving gateway station and/or a signal transmission time between a current serving satellite and a current serving gateway station.

Figure 16:
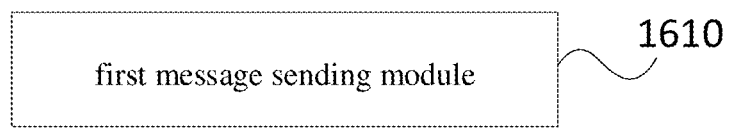
FIG. 16 is a schematic structural diagram of a device for determining satellite communication system parameters according to another embodiment of the disclosure.

A device for determining satellite communication system parameters applied to a service device is further provided in an embodiment of the present disclosure. As shown in FIG. 16, the device includes:
a first message sending module 1610, configured to send a system message to a terminal, where the system message includes gateway station information.

Optionally, the system message includes the gateway station information of each gateway station in a network or the gateway station information of the gateway station currently connected to the terminal.

Optionally, the system message is:
a main information block MIB message, a system information block SIB message, or a remaining minimum system message RMSI.

Optionally, the gateway station information includes geographic location information of a gateway station.

Figure 17:
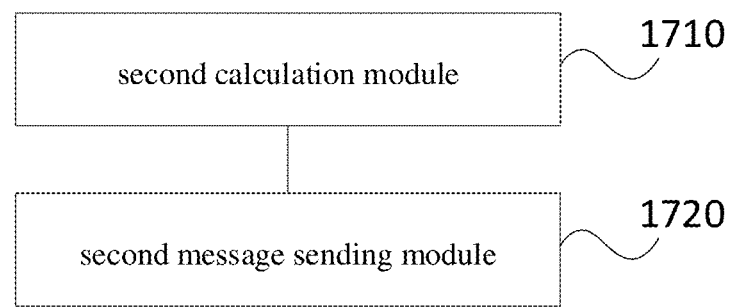
FIG. 17 is a schematic structural diagram of an apparatus for determining satellite communication system parameters according to another embodiment of the present disclosure.

A device for determining satellite communication system parameters applied to a service device is further provided in an embodiment of the present disclosure. As shown in FIG. 17, the device includes:
a second calculation module 1710, configured to calculate feeder link information of a current communication link of a terminal according to an ephemeris information table;
a second message sending module 1720, configured to send the feeder link information to the terminal.

Optionally, the sending the feeder link information to the terminal includes:
sending the feeder link information through a system message in a common channel; or
sending the feeder link information through a user messages in a service channel.

Optionally, the calculating the feeder link information of the current communication link of the terminal according to the ephemeris information table includes:
calculating the feeder link information of the current communication link of the terminal every fourth preset period;
the sending the feeder link information to the terminal includes:
sending the feeder link information to the terminal every fifth preset period.

In another aspect, the specific embodiments of the present disclosure also provide a computer-readable storage medium, wherein a computer program is stored on the computer-readable storage medium, and when the computer program is executed by a processor, any one of the steps in the method of determining satellite communication system parameters.

Based on the above description, those skilled in the art should be able to understand the specific structure of the computer-readable storage medium that executes the beam failure reporting method of the present disclosure, which will not be described in detail here.

In addition, it should be pointed out that in the device and method of the present disclosure, obviously, each component or each step can be decomposed and/or recombined. These decomposition and/or recombination should be regarded as equivalent solutions of the present disclosure. In addition, the steps of performing the above series of processing can naturally be performed in a chronological order in the order of description, but do not necessarily need to be performed in a chronological order, and some steps can be performed in parallel or independently of each other. Those of ordinary skill in the art can understand that all or any of the steps or components of the method and device of the present disclosure can be used in any computing device (including a processor, storage medium, etc.) or a network of computing devices, using hardware, firmware, software, or a combination of them. This can be achieved by those of ordinary skill in the art using their basic programming skills after reading the description of the present disclosure.

Therefore, the purpose of the present disclosure can also be realized by running a program or a group of programs on any computing device. The computing device may be a well-known general-purpose device. Therefore, the purpose of the present disclosure can also be achieved only by providing a program product containing program code for implementing the method or device. That is, such a program product also constitutes the present disclosure, and a storage medium storing such a program product also constitutes the present disclosure. Obviously, the storage medium may be any well-known storage medium or any storage medium developed in the future. It should also be pointed out that in the device and method of the present disclosure, obviously, each component or each step can be decomposed and/or recombined. These decomposition and/or recombination should be regarded as equivalent solutions of the present disclosure. In addition, the steps for executing the above-mentioned series of processing can naturally be executed in time sequence in the order of description, but it is not necessarily executed in time sequence. Some steps can be performed in parallel or independently of each other.

Each module, unit, sub-unit or sub-module may be one or more integrated circuits configured to implement the above methods, for example: one or more application specific integrated circuits (ASIC), or, one or more Microprocessor (digital signal processor, DSP), or, one or more Field Programmable Gate Array (Field Programmable Gate Array, FPGA), etc. For another example, when one of the above modules is implemented in the form of processing element scheduling program code, the processing element may be a general-purpose processor, such as a central processing unit (CPU) or other processors that can call program codes. For another example, these modules can be integrated together and implemented in the form of a system-on-a-chip (SOC).

The terms "first" and "second" in the specification and claims of this application are used to distinguish similar objects, and not necessarily used to describe a specific sequence or sequence. It should be understood that the data used in this way can be interchanged under appropriate circumstances, so that the embodiments of the present application described herein are, for example, implemented in a sequence other than those illustrated or described herein. In addition, the terms "including" and "having" and any variations of them are intended to cover non-exclusive inclusions. For example, a process, method, system, product, or device that includes a series of steps or units is not necessarily limited to what is clearly listed. Those steps or units may include other steps or units that are not clearly listed or are inherent to these processes, methods, products, or device. In addition, the use of "and/or" in the description and claims means at least one of the connected objects, such as A and/or B and/or C, which means that it includes A alone, B alone, C alone, and both A and B. Exist, B and C exist, A and C exist, and A, B, and C all exist in 7 situations. Similarly, the use of "at least one of A and B" in this specification and claims should be understood as "A alone, B alone, or both A and B exist".

The above are optional embodiments of the present invention. It should be pointed out that for those of ordinary skill in the art, without departing from the principles described in this disclosure, several improvements and modifications can be made, and these improvements and modifications should also be made. It is regarded as the protection scope of this disclosure.

What is claimed is:

1. A method for determining satellite communication system parameters, applied to a terminal, wherein the terminal comprises a transceiver, a memory, and a processor, and the method comprises:
   the processor calling and executing programs and data stored in the memory to perform:
      obtaining gateway station information, according to an ephemeris information table or a system message;
      calculating feeder link information of a current communication link, according to the obtained gateway station information; and
      determining a satellite communication system parameter of the terminal according to the feeder link information;
   wherein prior to the calculating the feeder link information of the current communication link according to the obtained gateway station information, the method further comprises:
      determining a current serving satellite of the terminal according to satellite information in the ephemeris information table;
   wherein the calculating the feeder link information of the current communication link according to the obtained gateway station information comprises:
      determining a current serving gateway station of the terminal according to the obtained gateway station information;
      calculating the feeder link information of the current communication link according to the current serving satellite and the current serving gateway station.

2. The method for determining satellite communication system parameters according to claim 1, wherein
   in a case that the gateway station information is obtained according to the ephemeris information table, the gateway station information of each gateway station in a network is obtained;
   in a case that the gateway station information is obtained according to the system message, the gateway station information of each gateway station in the network or the gateway station information of one gateway station or at least two gateway stations currently connected to the terminal is obtained.

3. The method for determining satellite communication system parameters according to claim 2, wherein in a case that the gateway station information of each gateway station in the network is obtained according to the ephemeris information table or the system message, or in a case that the gateway station information of the at least two gateway stations currently connected to the terminal is obtained according to the system message, the determining the current serving gateway station of the terminal according to the obtained gateway station information comprises:
calculating a distance from the current serving satellite to each gateway station of which the gateway station information is obtained, according to the current serving satellite and the obtained gateway station information;
selecting the gateway station nearest to the current serving satellite as the current serving gateway station.

4. The method for determining satellite communication system parameters according to claim 2, wherein in a case that the gateway station information of the one gateway station currently connected to the terminal is obtained according to the system message, the determining the current serving gateway station of the terminal according to the obtained gateway station information comprises:
determining the gateway station currently connected to the terminal as the current serving gateway station.

5. The method for determining satellite communication system parameters according to claim 1, wherein the system message is:
a main information block MIB message, a system information block SIB message, or a remaining minimum system message RMSI.

6. The method for determining satellite communication system parameters according to claim 1, wherein the gateway station information comprises geographic location information of the gateway station.

7. The method for determining satellite communication system parameters according to claim 1, wherein the feeder link information comprises a distance between the current serving satellite and the current serving gateway station and/or a signal transmission time between the current serving satellite and the current serving gateway station.

8. The method for determining satellite communication system parameters according to claim 2, wherein in a case that the gateway station information of each gateway station in the network is obtained according to the ephemeris information table, the method further comprises:
before the terminal accesses the network, obtaining the ephemeris information table;
after the terminal accesses the network and when the ephemeris information table is updated, obtaining the updated ephemeris information table; and/or
after the terminal accesses the network, obtaining the ephemeris information table every first preset period.

9. The method for determining satellite communication system parameters according to claim 2, wherein in a case that the gateway station information of each gateway station in the network is obtained according to the system message, the method further comprises:
when the gateway station in the network changes, obtaining the updated gateway station information in the system message.

10. The method for determining satellite communication system parameters according to claim 1, wherein the calculating feeder link information of a current communication link, according to the obtained gateway station information is performed when at least one of the following conditions is met:
the terminal identifies the current serving satellite;
the terminal performs a preset communication process;
a time for calculating the feeder link information every second preset period is reached.

11. A method for determining satellite communication system parameters, applied to a terminal, wherein the terminal comprises a transceiver, a memory, and a processor, and the method comprises:
the processor calling and executing programs and data stored in the memory to perform:
obtaining feeder link information of a current communication link of the terminal sent by a gateway station, wherein the feeder link information is calculated by the gateway station according to the ephemeris information table and then sent by the gateway station;
determining a satellite communication system parameter of the terminal according to the feeder link information;
wherein the obtaining the feeder link information of the current communication link of the terminal sent by the gateway station comprises:
obtaining the feeder link information sent by the gateway station through a system message in a common channel; or
obtaining the feeder link information sent by the gateway station through a user message in a service channel.

12. The method for determining satellite communication system parameters according to claim 11, wherein the obtaining the feeder link information of the current communication link of the terminal sent by the gateway station comprises:
obtaining the feeder link information of the current communication link of the terminal sent by the gateway station, every third preset period;
the feeder link information comprises a distance between a current serving satellite and a current serving gateway station and/or a signal transmission time between a current serving satellite and a current serving gateway station.

13. A method for determining satellite communication system parameters, applied to a service device, wherein the service device comprises a transceiver, a memory, and a processor, and the method comprises:
the processor controlling the transceiver to perform: sending a system message to a terminal, wherein the system message comprises gateway station information, and the gateway station information is configured to enable the terminal to calculate feeder link information of a current communication link according to the gateway station information and determine a satellite communication system parameter of the terminal according to the feeder link information;
wherein the system message is:
a main information block MIB message, a system information block SIB message, or a remaining minimum system message RMSI;
the gateway station information comprises geographic location information of a gateway station.

14. The method for determining satellite communication system parameters according to claim 13, wherein the system message comprises the gateway station information of each gateway station in a network or the gateway station information of one gateway station or at least two gate stations currently connected to the terminal.

15. A terminal, comprising: a transceiver, a memory, a processor, and a program stored on the memory and executable on the processor; the processor is configured to perform the method for determining satellite communication system parameters according to claim 1.

16. A terminal, comprising: a transceiver, a memory, a processor, and a program stored on the memory and executable on the processor; the processor is configured to perform the method for determining satellite communication system parameters according to claim 11.

17. A service device, comprising: a transceiver, a memory, a processor, and a program stored on the memory and executable on the processor; the processor is configured to perform the method for determining satellite communication system parameters according to claim 13.

* * * * *